United States Patent [19]

Anezaki et al.

[11] Patent Number: 5,198,876
[45] Date of Patent: Mar. 30, 1993

[54] METHOD OF MEASURING THREE-DIMENSIONAL POSTION OF WORKPIECE

[75] Inventors: Takashi Anezaki, Hirakata; Hitoshi Kubota, Moriguchi; Manabu Yamane, Neyagawa, all of Japan

[73] Assignee: Matsushita Electric Industrial Co., Ltd., Osaka, Japan

[21] Appl. No.: 791,223

[22] Filed: Nov. 13, 1991

[30] Foreign Application Priority Data

Nov. 13, 1990 [JP] Japan .................. 2-307522

[51] Int. Cl.$^5$ .............................. G01B 11/00
[52] U.S. Cl. .................. 356/375; 358/107; 382/8; 901/47
[58] Field of Search .............. 356/375; 382/8; 358/107; 901/47; 250/561

[56] References Cited

U.S. PATENT DOCUMENTS 4,961,155 10/1990 Ozeki et al. ................. 356/375

FOREIGN PATENT DOCUMENTS

65203 4/1984 Japan ................. 356/375
257206 10/1989 Japan ................. 356/375

Primary Examiner—F. L. Evans
Attorney, Agent, or Firm—Wenderoth, Lind & Ponack

[57] ABSTRACT

A method of measuring a three-dimensional position of a workpiece by using a laser measuring unit provided at a hand portion of an industrial robot, the laser measuring unit including an image recognition camera and first and second laser beam sources for emitting lateral and vertical slit beams, respectively, the method comprising the steps of: positioning the laser measuring unit such that the laser measuring unit confronts the workpiece; emitting the lateral and vertical slit beams towards the workpiece from the first and second laser beam sources, respectively; inputting the lateral and vertical slit beams on the workpiece, as first and second slit images, into the image recognition camera, respectively; detecting a first point of a maximum output of the lateral slit beam at an edge of the workpiece in the first slit image and a second point of a maximum output of the vertical slit beam at another edge of the workpiece in the second slit image; and calculating the three-dimensional position of the workpiece based on a first amount of deviation of the first point from a first preset reference point and a second amount of deviation of the second point from a second preset reference point.

4 Claims, 9 Drawing Sheets

METHOD OF MEASURING THREE-DIMENSIONAL POSTION OF WORKPIECE

BACKGROUND OF THE INVENTION

The present invention relates to a method of measuring a three-dimensional position of a workpiece, which can be suitably applied to a case in which white balance and cut-off of an industrial display unit (hereinbelow, referred to as a "display unit") are automatically adjusted by a robot.

Conventionally, it is difficult to position a display unit with high precision during production processes of the display unit due to rotational construction of the display unit or peculiar shape of its cathode ray tube. Therefore, it is also difficult to position a printed circuit board attached to a rear portion of the cathode ray tube and thus, the printed circuit board is positioned manually in many cases.

In order to automatically adjust white balance and cut-off of the display unit, such methods have been tried that (1) the printed circuit board attached to the rear portion of the cathode ray tube is secured by a jig and (2) reading of a present position of the printed circuit board by bringing a probe into contact with the printed circuit board by a robot enabling force control is repeated at a total of 6 points such that a three-dimensional position of the printed circuit board is obtained.

However, in the method (1), since many models of the display units are proposed in recent years, position of the jig should be changed according to the models of the display units. Furthermore, in the case of a display unit having rotational construction, the method (1) has such a drawback that it is next to impossible to fix position of the jig.

Meanwhile, in the method (2), since accuracy of force control of the robot is poor and the printed circuit board is deflected through its contact with the probe, it is difficult to obtain accurate position of the printed circuit board. In addition, the method (2) has such a disadvantage that since measurement is performed at 6 points, a measuring period is increased.

SUMMARY OF THE INVENTION

Accordingly, an essential object of the present invention is to provide a method of measuring a three-dimensional position of a workpiece such as a printed circuit board on the basis of visual recognition through non-contact with the workpiece.

In order to accomplish this object of the present invention, there is provided a method of measuring a three-dimensional position of a workpiece by using a laser measuring unit provided at a hand portion of an industrial robot, according to a first embodiment of the present invention, the laser measuring unit including an image recognition camera, a first laser beam source for emitting a lateral slit beam obliquely and forwardly from a vertical axis of a visual coordinate system of the image recognition camera and a second laser beam source for emitting a vertical slit beam obliquely and forwardly from a lateral axis of the visual coordinate system, the method comprising: the first step of positioning the laser measuring unit such that the laser measuring unit confronts the workpiece; the second step of emitting the lateral and vertical slit beams towards the workpiece from the first and second laser beam sources, respectively; the third step of inputting the lateral and vertical slit beams on the workpiece, as first and second slit images, into the image recognition camera, respectively; the fourth step of detecting a first point of a maximum output of the lateral slit beam at an edge of the workpiece in the first slit image and a second point of a maximum output of the vertical slit beam at another edge of the workpiece in the second slit image; and the fifth step of calculating the three-dimensional position of the workpiece based on a first amount of deviation of the first point from a first preset reference point and a second amount of deviation of the second point from a second preset reference point.

Meanwhile, a method according to a second embodiment of the present invention further comprises: the sixth step of displacing the laser measuring unit relative to the workpiece; the first to sixth steps being performed a plurality of times so as to calculate three-dimensional coordinates of the workpiece at not less than three positions of the workpiece such that the three-dimensional position of the workpiece is calculated.

Furthermore, in a method according to a third embodiment of the present invention, when the three-dimensional position of the workpiece is calculated on the basis of the first and second slit images, the laser measuring unit is displaced through a predetermined amount per each of a plurality of times relative to a reference workpiece fixed at a reference position so as to detect an amount of displacement of each of the first and second slit images such that a continuous functional relation between the predetermined amount of displacement of the laser measuring unit and the amount of displacement of each of the first and second slit images is established preliminarily.

In accordance with the present invention, the lateral slit beam and the vertical slit beam are, respectively, irradiated at the vertical and lateral edges of the workpiece and the lateral and vertical slit images are inputted to the image recognition camera. Thus, based on the amounts of deviation of the lateral and vertical slit images from the preset reference points, respectively, it becomes possible to measure the three-dimensional position of the workpiece.

Meanwhile, when the above described measuring steps are repeated by displacing the laser measuring unit in an optical direction of the camera, the three-dimensional positions of the workpiece can be measured at not less than three points of the workpiece, so that the three-dimensional position of the workpiece as a whole can be measured.

Furthermore, when the laser measuring unit is displaced in the optical direction of the camera relative to the reference workpiece and relation between displacement of the laser measuring unit and displacement of each of the lateral and vertical slit images is established preliminarily, not only determination of the reference points but measurement of the three-dimensional position of the workpiece can be performed automatically.

BRIEF DESCRIPTION OF THE DRAWINGS

This object and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
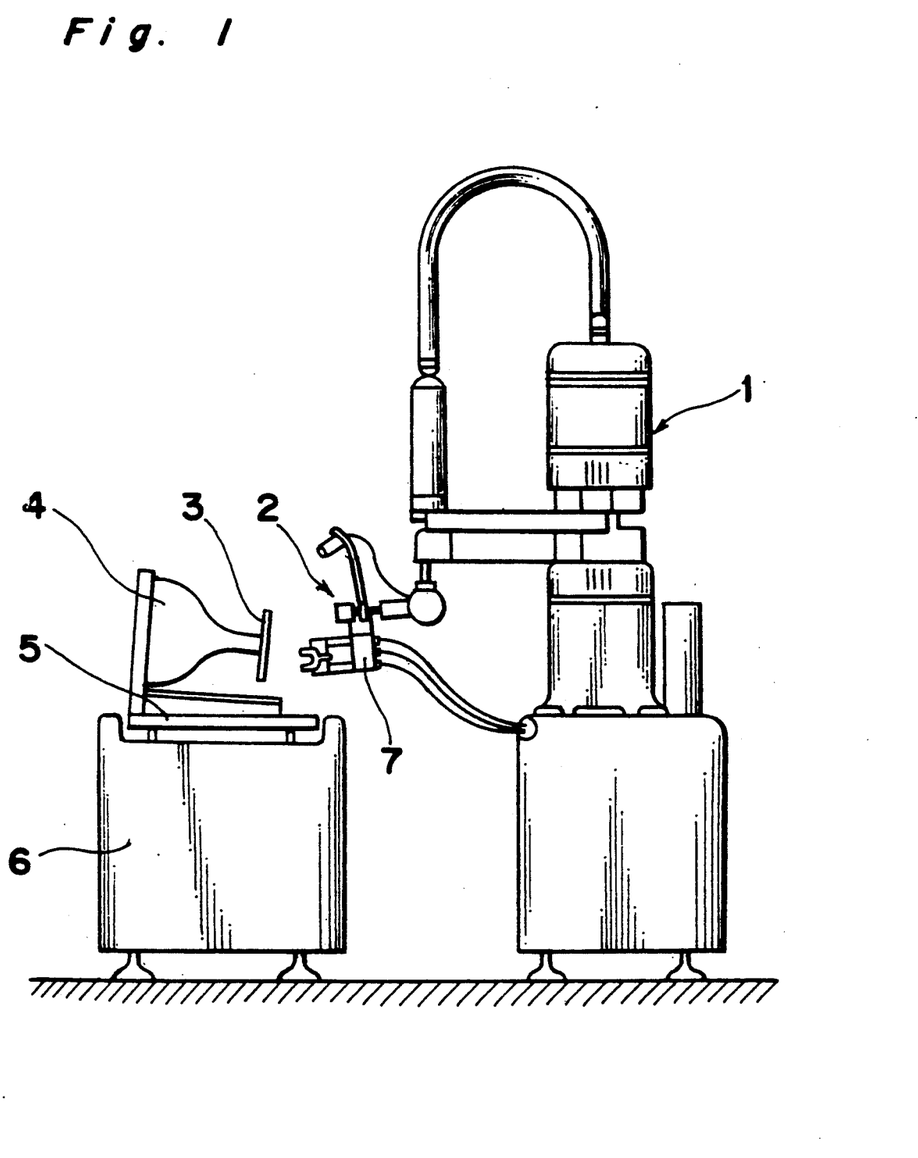
FIG. 1 is a schematic front elevational view of a measuring system for measuring a three-dimensional position of a workpiece, which is used in a method of measuring the three-dimensional position of the workpiece, according to a first embodiment of the present invention.
Figure 3:
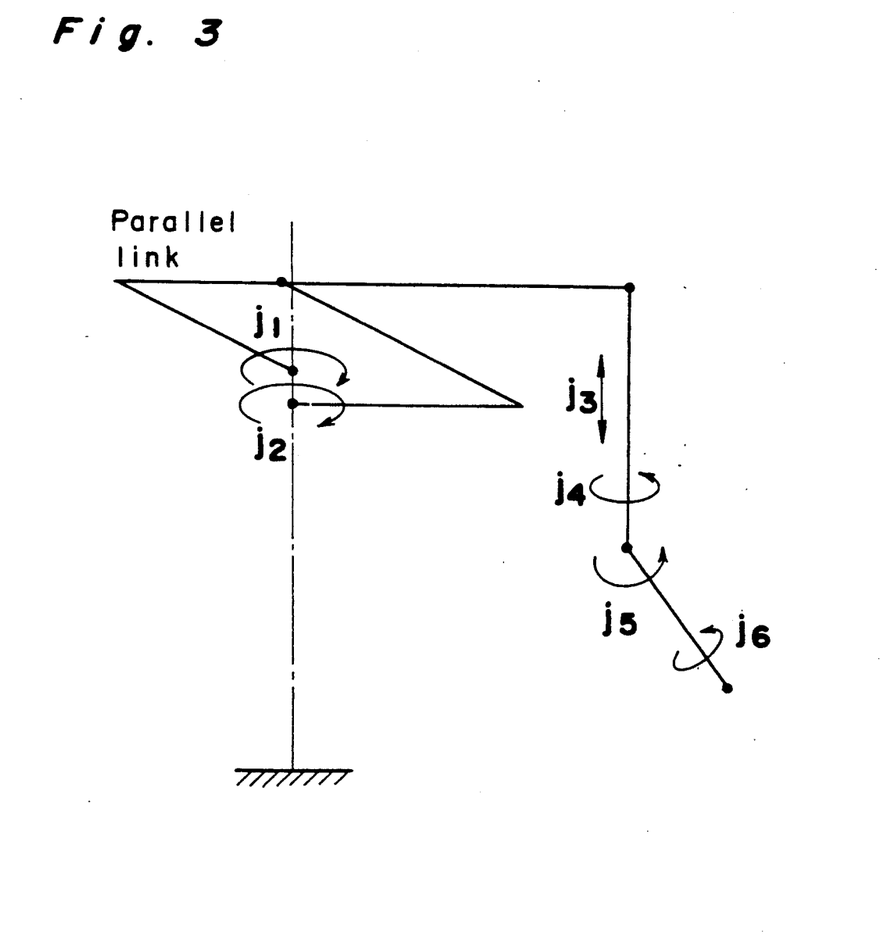
FIG. 3 is a view showing actuating axes of a robot employed in the measuring system of FIG. 1.

Referring now to the drawings, there is shown in FIG. 1, a measuring system for measuring a three-dimensional position of a workpiece such as a printed circuit board 3 by using slit beams, which is used in a method of measuring a three-dimensional position of the workpiece, according to a first embodiment of the present invention. The measuring system includes a robot 1 and a laser measuring unit 2. The printed circuit board 3 is mounted on a rear portion of a cathode ray tube 4 of a display unit such that a laser beam is irradiated over the printed circuit board 3. The cathode ray tube 4 is placed on a pallet 5 transported by a conveyor 6. As shown in FIG. 3, the robot 1 has a total of 6 actuating axes j1 to j6 such that a distal end of the actuating axis j6 can assume an arbitrary position and an arbitrary attitude.

Figure 2:
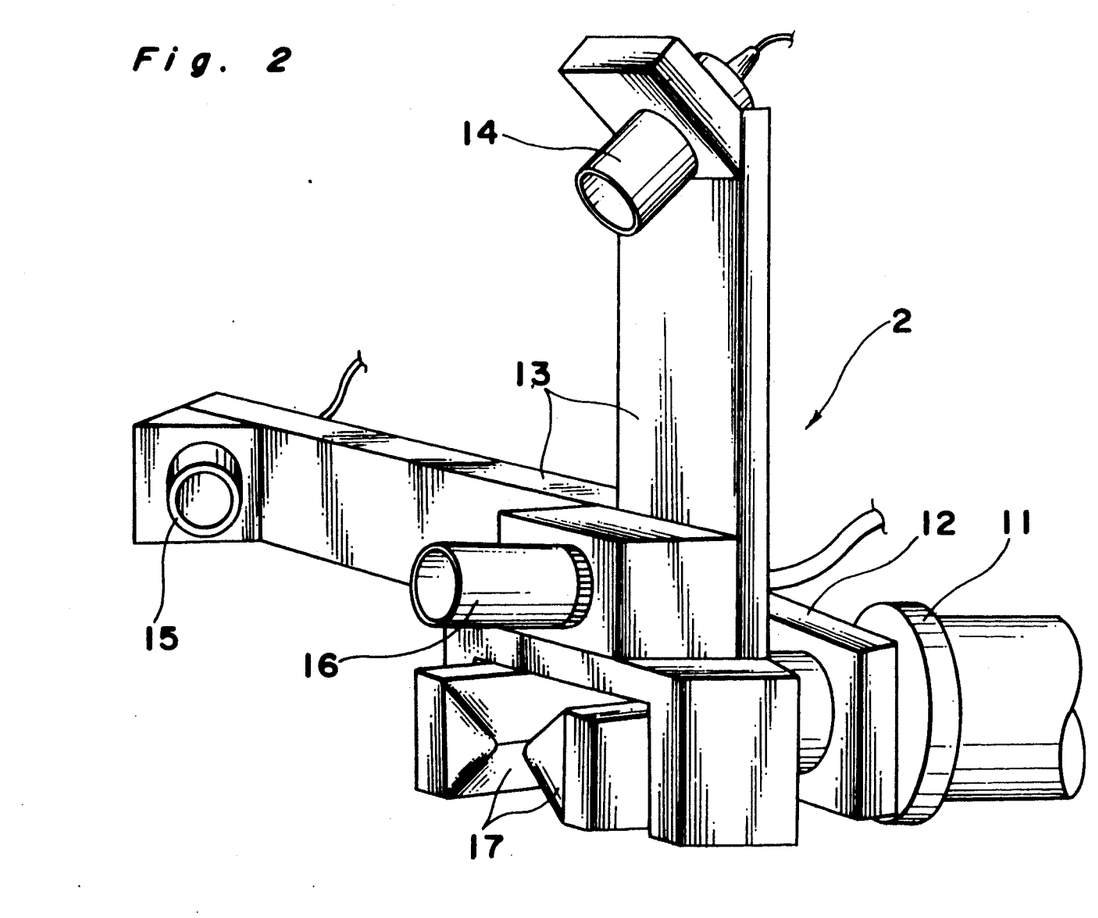
FIG. 2 is an enlarged fragmentary perspective view of a laser measuring unit employed in the measuring system of FIG. 1.

As shown in FIG. 2, the laser measuring unit 2 is mounted on a bracket 12 secured to a flange 11 which is provided at the distal end of the actuating axis j6. A support bracket 13 is mounted on the bracket 12. A lateral laser beam source 14 for emitting a lateral slit beam, a vertical laser beam source 15 for emitting a vertical slit beam and a camera 16 are mounted on the support bracket 13. The lateral and vertical beam sources 14 and 15 are spaced 90° from each other about an optical axis of the camera 16 such that a lateral slit image from the lateral laser beam source 14 and a vertical slit image from the vertical laser beam source 15 are, respectively, disposed in parallel with an X-axis and a Y-axis of a visual coordinate system of the camera 16. The laser measuring unit 2 further includes a pneumatic grip 17 mounted on the bracket 12. The pneumatic grip 17 has a pair of claws which are pneumatically opened and closed so as to grip an electrical adjusting device 7 (FIG. 1).

Figure 4:
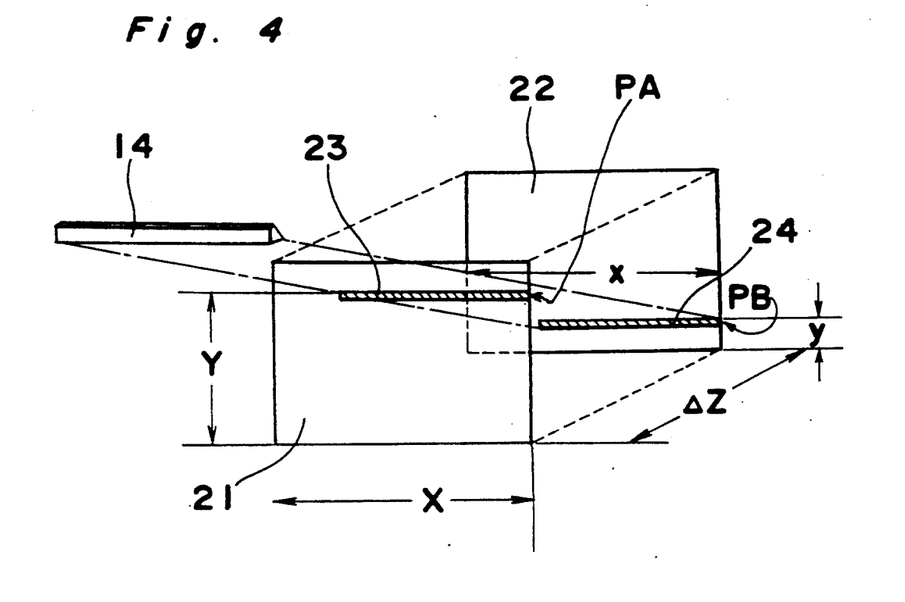
FIGS. 4 and 5 are schematic views showing a measurement principle based on a lateral slit beam and a vertical slit beam in the method of FIG. 1, respectively.
Figure 5:
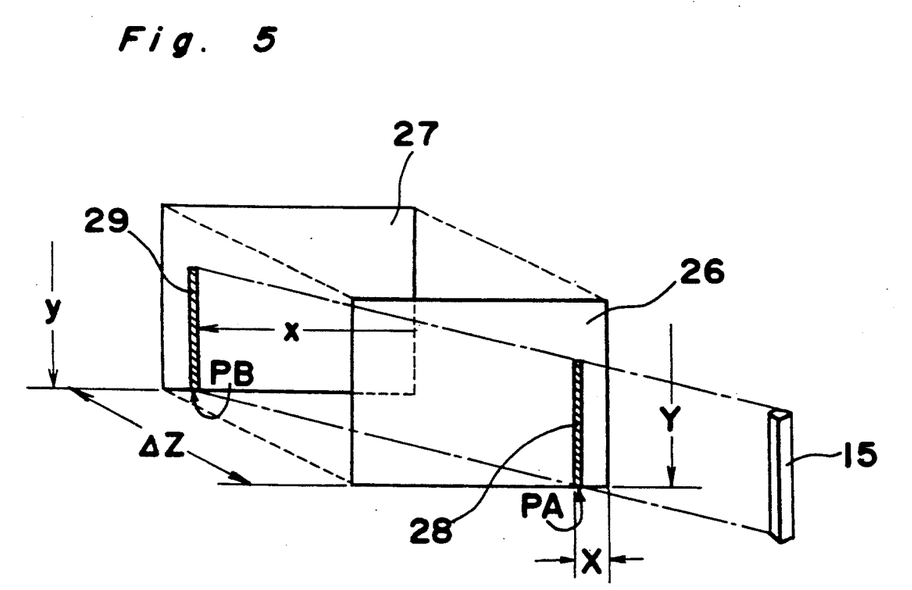

Then, a principle in which the three-dimensional position of the workpiece is measured by using the lateral and vertical slit beams is described with reference to FIGS. 4 and 5. FIG. 4 shows a technique in which the three-dimensional position of the workpiece is measured by using the lateral slit beam, while FIG. 5 shows a technique in which the three-dimensional position of the workpiece is measured by using the vertical slit beam. In FIG. 4, reference numerals 21 and 22 denote irradiation planes of the workpiece, on which the lateral slit beam is irradiated. The irradiation plane 22 is displaced from the irradiation plane 21 through a distance of $\Delta Z$ in a travelling direction of the lateral slit beam. Character PA denotes coordinates of an endpoint of a lateral slit image 23 on the irradiation plane 21, while symbol "PB" denotes coordinates of an endpoint of a lateral slit image 24 on the irradiation plane 22. If PA=(X, Y, Z) and PB=(x, y, z), then:

$$Z = z + K_Y(Y - y) \tag{1}$$

where symbol "$K_Y$" denotes is a constant.

Meanwhile, in FIG. 5, reference numerals 26 and 27 denote irradiation planes of the workpiece, on which the vertical slit beam is irradiated. The irradiation plane 27 is displaced from the irradiation plane 26 through the distance of $\Delta Z$ in a travelling direction of the vertical slit beam. Character PA denotes coordinates of an endpoint of a vertical slit beam 28 on the irradiation plane 26, while symbol "PB" denotes coordinates of an endpoint of a vertical slit image 29 on the irradiation plane 27. If PA=(X, Y, Z) and PB=(x, y, z), then:

$$Z = z + K_X(X - x) \tag{2}$$

where symbol "$K_X$" denotes a constant.

Figure 6:
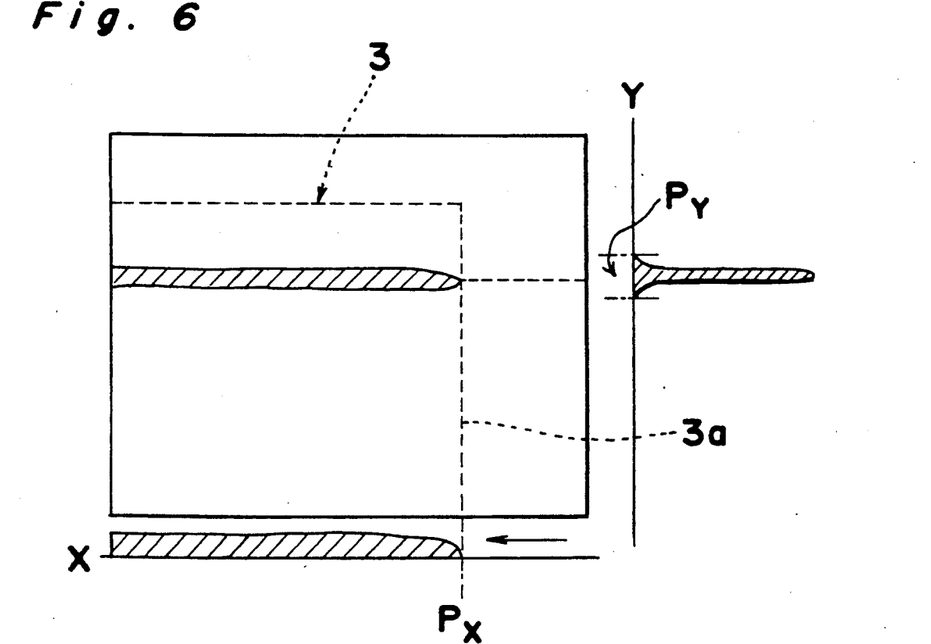
FIG. 6 is a view showing a binary-coded image of the lateral slit beam of FIG. 4.

Hereinbelow, a method of calculating the three-dimensional position of the workpiece based on the above mentioned principle of the lateral and vertical slit beams by utilizing the measuring system of FIG. 1 is described. Initially, a recognition method based on the lateral slit beam is described. When the lateral slit image is binary coded, a binary-coded lateral slit image is obtained as shown in FIG. 6. When mapping is performed on the X-axis and the Y-axis of the visual coordinate system and an initial acceptable mapping point is searched in the plus (+) direction of the X-axis, i.e. in the direction of the arrow, a coordinate $P_X$ is obtained. Subsequently, when the brightest point in the lateral slit image which has not yet been binary coded is searched on the straight line X=$P_X$, i.e. a vertical edge 3a of the workpiece 3, a coordinate $P_Y$ is obtained. By substituting the coordinate $P_Y$ for Y, i.e. Y=$P_Y$ in the equation (1), a coordinate $P_Z$ is obtained. Thus, if a reference point is given, it becomes possible to measure a three-dimensional position of a point on the vertical edge 3a of the workpiece 3.

Figure 7:
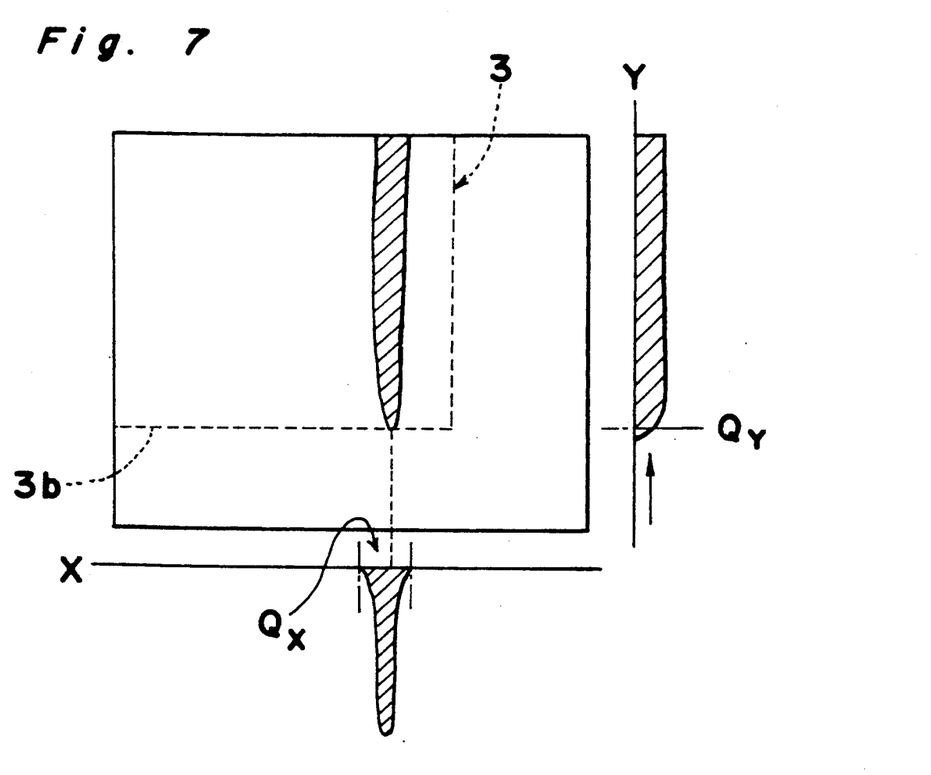
FIG. 7 is a view showing a binary-coded image of the vertical slit beam of FIG. 5.

Then, a recognition method based on the vertical slit beam is described. When the vertical slit image is binary coded, a binary-coded vertical slit image is obtained as shown in FIG. 7. When mapping is performed on the X-axis and the Y-axis of the visual coordinate system and an initial acceptable point is searched in the plus (+) direction of the Y-axis, i.e. in the direction of the arrow, a coordinate $Q_Y$ is obtained. Thereafter, when the brightest point is searched on the straight line $Y=Q_Y$, i.e. a lateral edge 3b of the workpiece 3, a coordinate $Q_X$ is obtained. By substituting the coordinate $Q_X$ for X, i.e. $X=Q_X$ in the equation (2), a coordinate $Q_Z$ is obtained. Thus, if a reference point is given, it becomes possible to measure a three-dimensional position of a point on the lateral edge 3b of the workpiece 3. Consequently, the three-dimensional positions of the two points on the workpiece 3 can be measured.

Hereinbelow, a method of converting a position in the visual coordinate system into that of CGS unit system is described. Characters $G_X$, $G_Y$ and $G_Z$ denote scaling factors for converting a pixel in the visual coordinate system into that of CGS unit system in the directions of the X-axis, Y-axis and Z-axis of the visual coordinate system, respectively. Assuming that a pixel at the endpoint of the lateral slit image has the coordinates $P_X$ and $P_Y$ and an endpoint of the lateral slit image in CGS unit system has the coordinates X and Y, the following relations are obtained.

$$X = G_X \times P_X$$

$$Y = G_Y \times P_Y$$

$$Z = G_Z \times P_Z$$

Likewise, assuming that a pixel at the endpoint of the vertical slit image has the coordinates $Q_X$ and $Q_Y$ and an endpoint of the vertical slit image in CGS unit system has the coordinates X and Y, the following relations are obtained.

$$X = G_X \times Q_X$$

$$Y = G_Y \times Q_Y$$

$$Z = G_Z \times Q_Z$$

By using the above equations, coordinates in the visual coordinate system can be obtained in CGS unit system from the endpoint of the lateral slit image and the endpoint of the vertical slit image.

Then, a method of converting coordinates in the visual coordinate system into those of an absolute coordinate system is described. Supposing that a present position of the camera 16 is represented by $P_{here}$ and an offset of the camera 16 relative to a face of the flange 11 is represented by $P_{camera}$, coordinates of an origin in the visual coordinate system are expressed by:

$$P_{here} : P_{camera}$$

where symbol ":" denotes multiplication of 4×4 matrixes.

Assuming that character $V=(V_X, V_Y, V_Z)$ denotes coordinates of the endpoint of the lateral slit image in the visual coordinate system, coordinates of the endpoint of the lateral slit image in the absolute coordinate system are expressed by $P=(P_X, P_Y, P_Z)$ as follows.

$$P = P_{here} : P_{camera} : V$$

Similarly, assuming that character $W=(W_X, W_Y, W_Z)$ denotes coordinates of the endpoint of the vertical slit image in the visual coordinate system, coordinates of the endpoint of the vertical slit image in the absolute coordinate system are expressed by $P=(P_X, P_Y, P_Z)$ as follows.

$$P = P_{here} : P_{camera} : W$$

Hereinbelow, a method of measuring the three-dimensional position of the workpiece (printed circuit board) 3 as a whole, according to a second embodiment of the present invention is described. In this embodiment, the three-dimensional position of the workpiece (printed circuit board) 3 is obtained based on the above mentioned calculation method by using the measuring system of FIG. 1. Generally, when the three-dimensional position of the printed circuit board is obtained, three-dimensional positions at not less than 3 points on the printed circuit board are required to be determined. To this end, the above mentioned method of the first embodiment is repeated by displacing the laser measuring unit 2 to proper positions.

Figure 8:
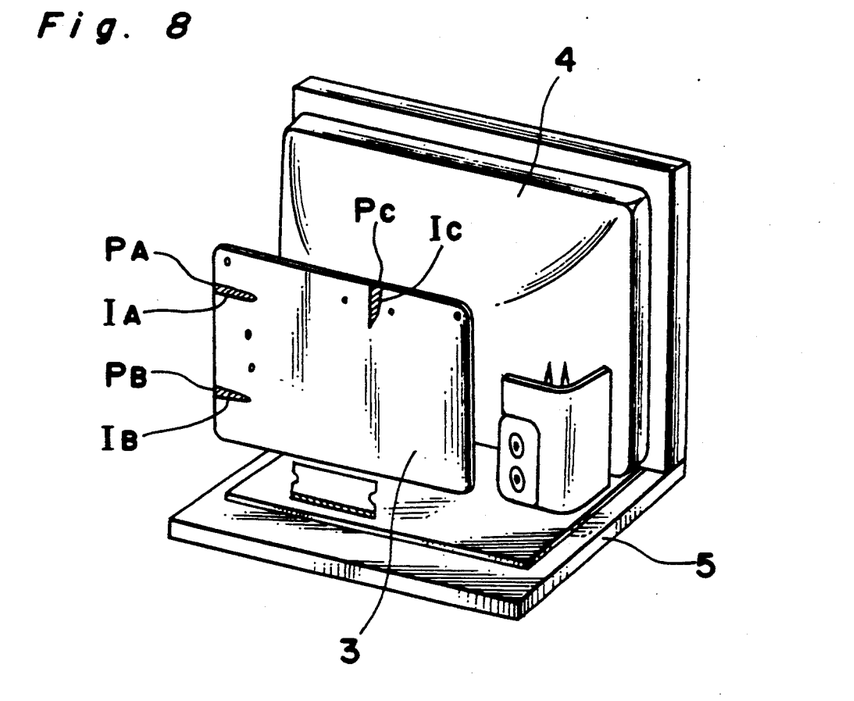
FIG. 8 is a perspective view showing irradiation of slit beams over a printed circuit board in a method according to a second embodiment of the present invention.
Figure 9:
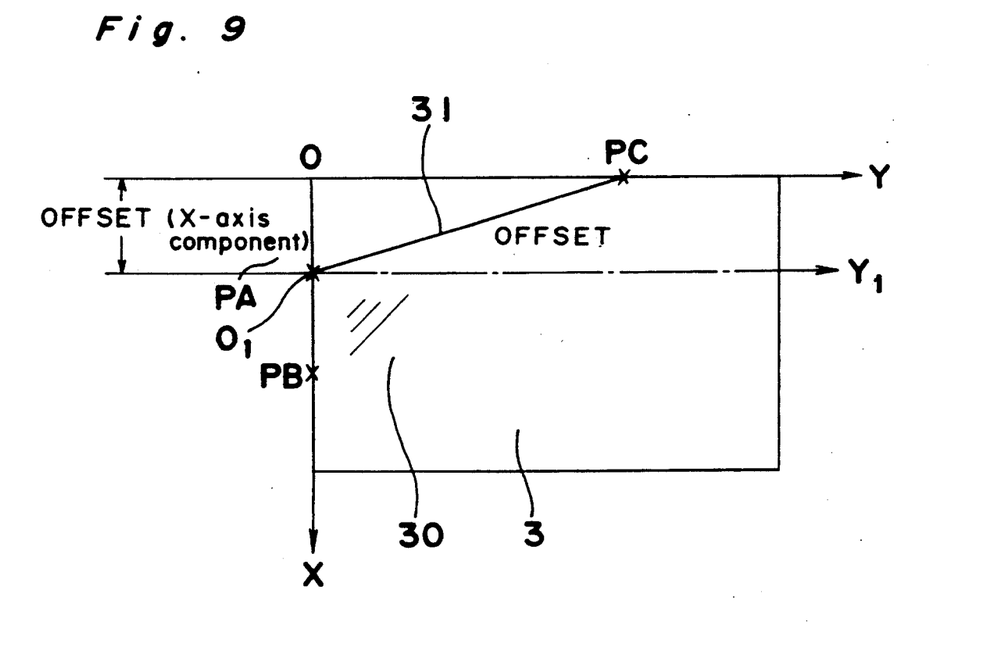
FIG. 9 is a schematic view indicative of calculation of the three-dimensional position in the method of FIG. 8.

More specifically, when the measuring system has been set at a proper measuring position relative to the workpiece 3, lateral slit images IA and IB and a vertical slit image IC are obtained as shown in FIG. 8. By the above described calculation method, the lateral slit images IA and IB have endpoints PA and PB, respectively, while the vertical slit image IC has an endpoint PC. By using FIG. 9, the three-dimensional position of the printed circuit board 3 is obtained. Assuming that reference numeral 30 denotes a coordinate system constituted by the points PA, PB and PC and symbol "FRAME" denotes a function in the coordinate system 30 which has the point PA as its origin, the point PB as a point on its X-axis and the point PC as a point disposed in a positive direction on its X-Y plane, the following relation is obtained.

$$O_1\_XY_1Z = \text{FRAME (PA, PB, PC)}$$

Then, supposing that symbol "INV" denotes an inverse matrix and symbol "OFFSET" denotes the point PC observed from $O_1\_XY_1Z$, the following relation is obtained.

$$\text{OFFSET} = \text{INV } (O_1\_XY_1Z) : PC$$

Assuming that character X denotes an operator for extracting an X-axis component and symbol "+X( )" denotes an operation of parallel displacement of the X-axis, the following relation is obtained.

$$O\_XYZ = O_1\_XY_1Z + X \text{ (OFFSET)}$$

Therefore, the three-dimensional position $O\_XYZ$ of the printed circuit board 3 is expressed in a coordinate system which is obtained by performing parallel displacement of the coordinate system $O_1\_XY_1Z$ through the X-axis component of OFFSET in the direction of the X-axis.

Figure 10:
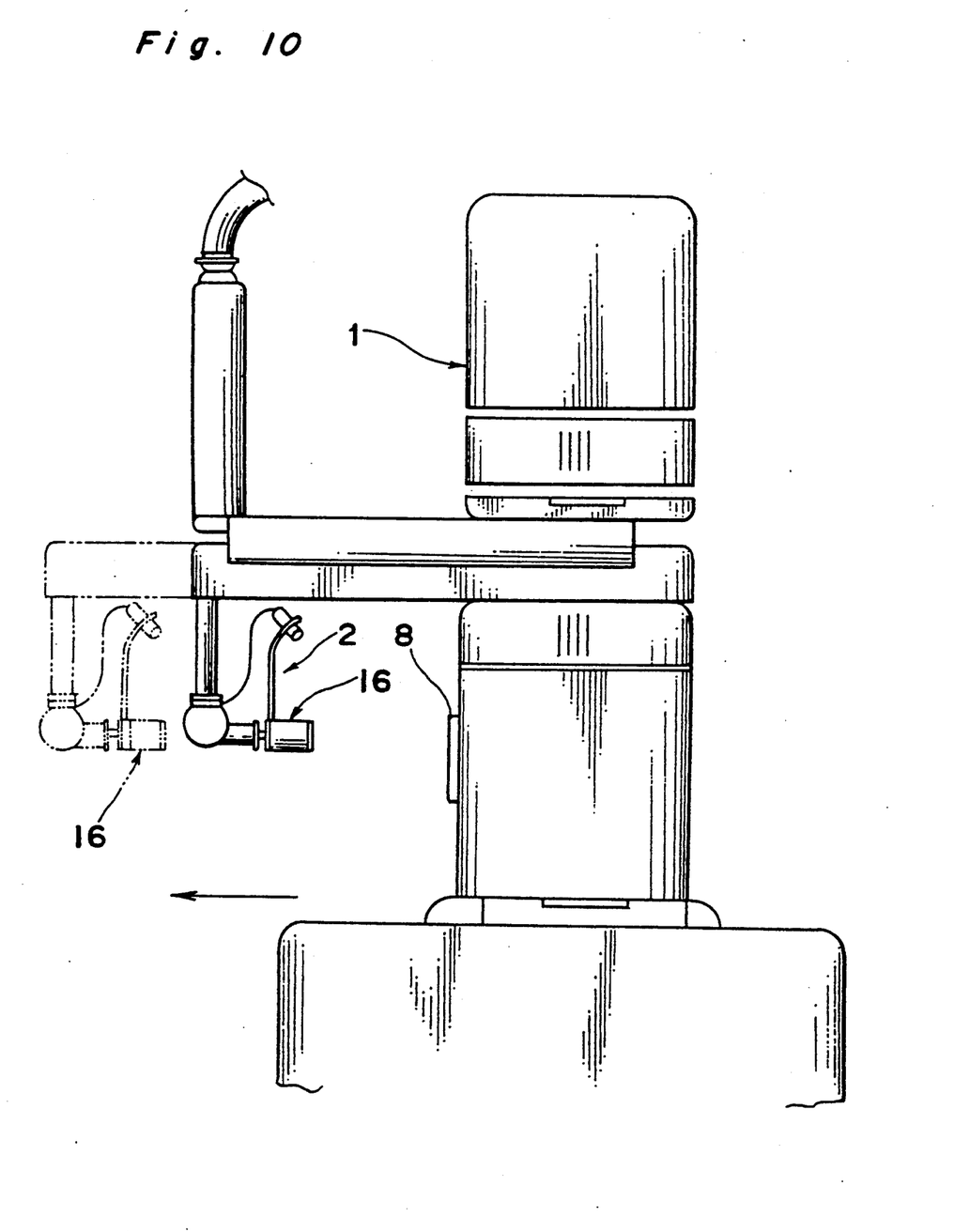
FIG. 10 is a schematic front elevational view of a measuring system used in a method according to a third embodiment of the present invention.

In the first and second embodiments of the present invention, the equations (1) and (2) are used for calculating the three-dimensional position of the workpiece. In these equations, the initial value Z (constant) and the constants $K_X$ and $K_Y$ are required to be calculated in advance. Hereinbelow, a third embodiment of the present invention is described in which these three constants are automatically calculated by using a measuring system shown in FIG. 10. In the measuring system, a square reference sample 8 is bonded to a side face of the robot 1 so as to be in parallel with the coordinate system of the robot 1.

Figure 11:
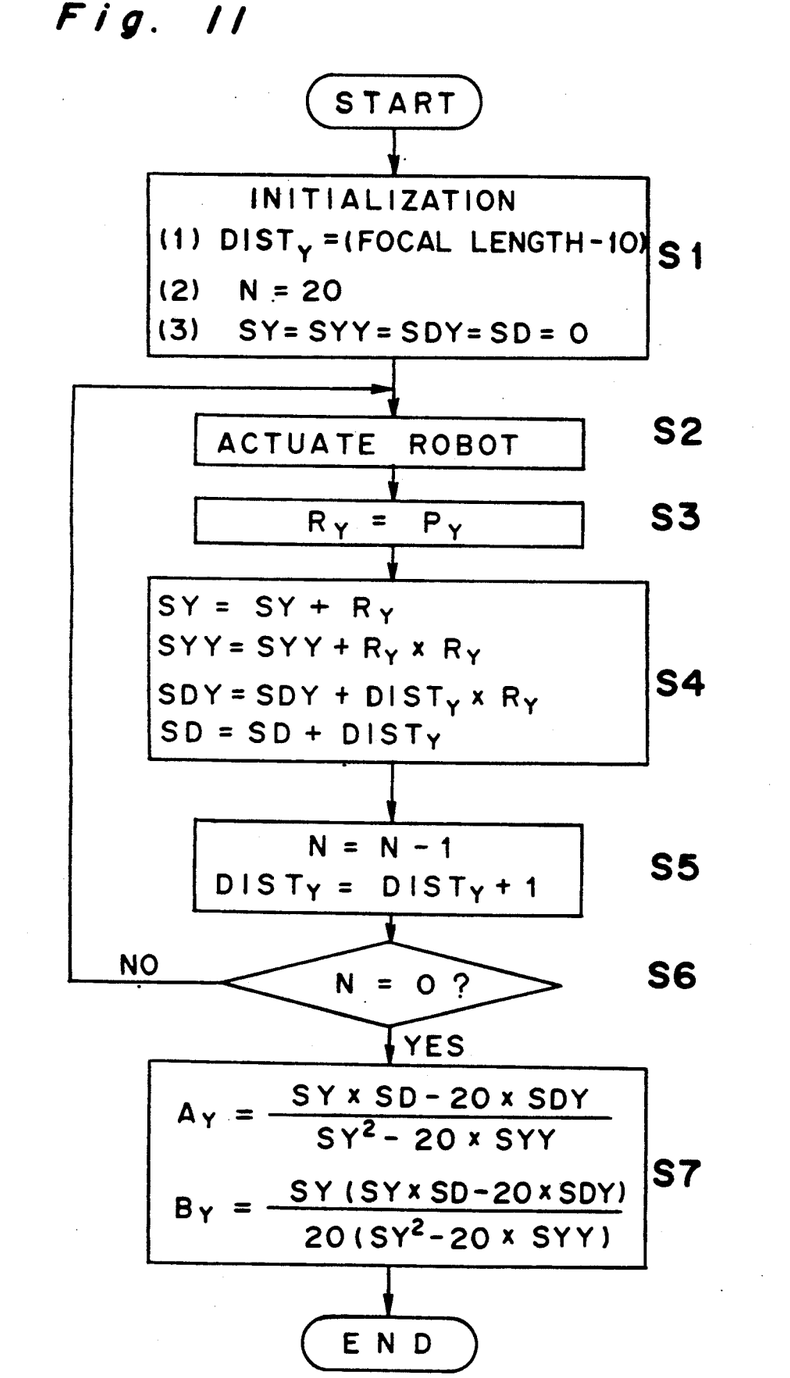
FIG. 11 is a flow chart showing a processing sequence of measurement based on a lateral slit beam in the method of FIG. 10.

With reference to a flow chart of FIG. 11, a method of calculating the three-dimensional position of the workpiece by using the lateral slit beam is described. At step S1, various data areas are initialized. At step S1, symbol "DIST$_Y$" denotes a distance from the camera 16 of the laser measuring unit 2 to the reference sample 8 and an initial value of the distance DIST$_Y$ is set at a distance of (focal length−10 mm) from the reference sample 8 as shown by the solid lines in FIG. 10. Meanwhile, symbol "SY" denotes a storage area for storing a sum of Y-axis components of endpoints of the lateral slit images, more strictly, a storage area for storing a sum of Y-axis coordinates of pixels in the visual coordinate system and an initial value of the storage area SY is 0. Symbol "SYY" denotes a storage area for storing a sum of squares of the Y-axis components of the endpoints of the lateral slit images, more strictly, a storage area for storing a sum of squares of Y-axis coordinates of pixels in the visual coordinate system and an initial value of the storage area SYY is 0. Meanwhile, symbol "SDY" denotes a value obtained by multiplying the distance DIST$_Y$ by the Y-axis component of the endpoint of the lateral slit image and an initial value of the value SDY is 0. Symbol "SD" denotes a sum of the distances DIST$_Y$ and an initial value of the sum SD is 0. Character N denotes the number of measurement and an initial value of the number N is 20. Furthermore, symbol "R$_Y$" denotes a resultant Y-axis coordinate of a pixel at the endpoint of the lateral slit image in the visual coordinate system at the time of recognition based on the lateral slit beam.

At step S2, the robot 1 is actuated such that the camera 16 of the laser measuring unit 2 is disposed perpendicularly to the reference sample 8 and at a distance of (focal length−10 mm) from the reference sample 8. Then, at step S3, recognition based on the lateral slit beam is performed and its recognition result is obtained as the variable R$_Y$=P$_Y$ Subsequently, at step S4, the variables SY, SYY, SDY and SD are calculated by the following equations.

$$SY = SY + R_Y$$

$$SYY = SYY + R_Y \times R_Y$$

$$SDY = SDY + DIST_Y \times R_Y$$

$$SD = SD + DIST_Y$$

At step S5, the number N of measurement is reduced by 1 and the distance DIST$_Y$ is updated. Thereafter, at step S6, it is judged whether or not the number N of measurement is equal to 0. In the case of "NO" at step S6, the processing sequence returns to step S2 and the above mentioned recognition and calculations are performed by moving the camera 16 of the laser measuring unit 2 through 1 mm away from the reference sample 8 by the robot 1. Namely, after measurement has been performed 20 times, the camera 16 of the laser measuring unit 2 is disposed at a distance of (focal length+10 mm) from the reference sample 8 as shown by the two-dot chain lines in FIG. 10. In the case of "YES" at step S6, variables A$_Y$ and B$_Y$ are obtained in a method of least squares by using the variables SY, SYY, SDY and SD obtained at step S4 as follows.

$$A_Y = (SY \times SD - 20 \times SDY) / (SY^2 - 20 \times SYY)$$

$$B_Y = SY(SY \times SD - 20 \times SDY) / 20(SY^2 - 20 \times SYY)$$

Thus, relation between the distance DIST$_Y$ and the Y-axis coordinate R$_Y$ is given by the following equation.

$$DIST_Y = A_Y \cdot R_Y + B_Y$$

Figure 12:
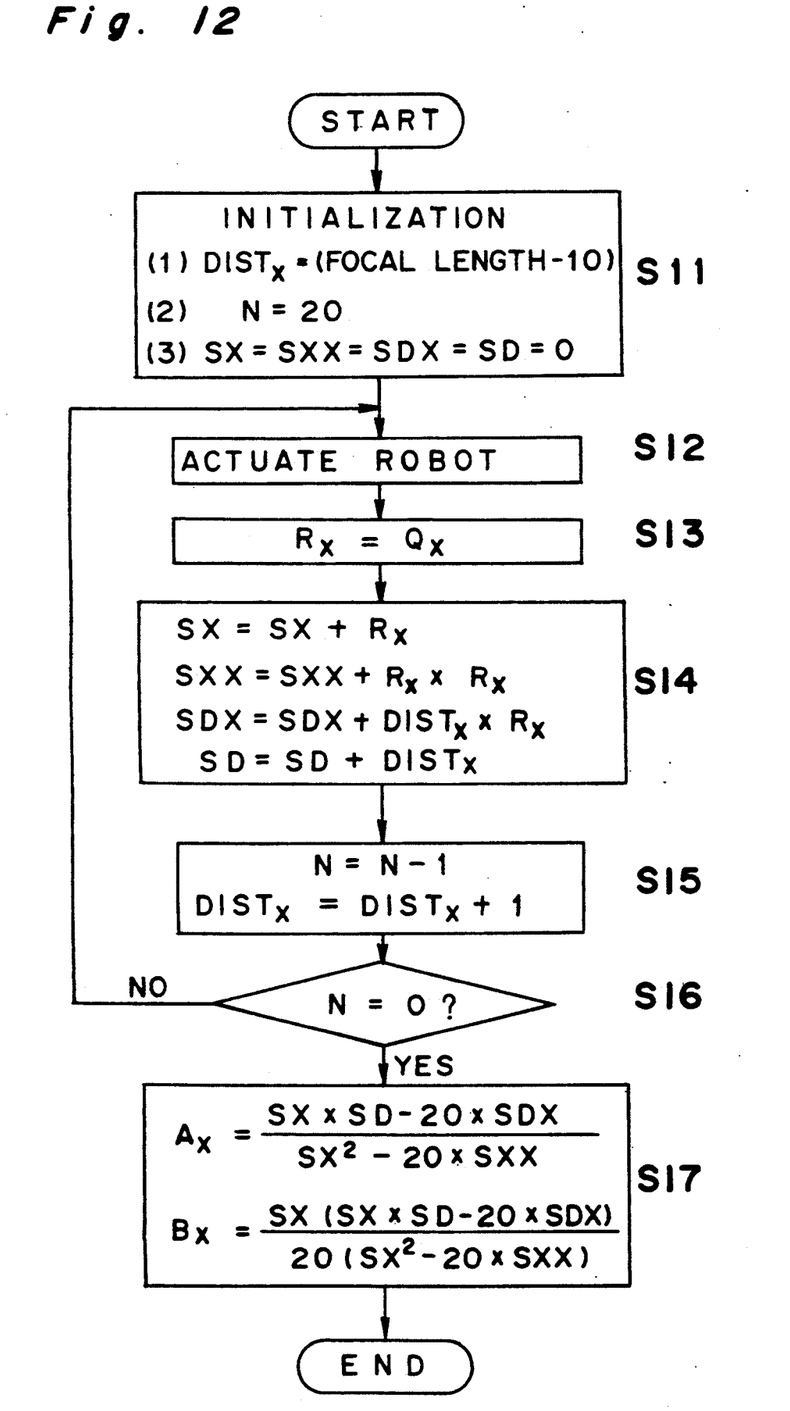
FIG. 12 is a flow chart showing a processing sequence of measurement based on a vertical slit beam in the method of FIG. 10.

Then, with reference to a flow chart of FIG. 12, a method of calculating the three-dimensional position of the workpiece by using the vertical slit beam is described. At step S11, various data areas are initialized. At step S11, symbol "DIST$_X$" denotes a distance from the camera 16 of the laser measuring unit 2 to the reference sample 8 and symbol "SX" denotes a storage area for storing a sum of X-axis components of endpoints of the vertical slit image, more strictly, a storage area for storing a sum of X-axis coordinates of pixels in the visual coordinate system. Meanwhile, symbol "SXX" denotes a storage area for storing a sum of squares of the X-axis components of the endpoints of the vertical slit images, more strictly, a storage area for storing a sum of squares of X-axis coordinates of pixels in the visual coordinate system. Symbol "SDX" denotes a value obtained by multiplying the distance DIST$_X$ by the X-axis component of the endpoint of the vertical slit image and symbol "SD" denotes a sum of the distances DIST$_X$. Furthermore, symbol "R$_X$" denotes a resultant X-axis coordinate of a pixel at the endpoint of the visual coordinate system at the time of recognition based on the vertical slit beam. Since steps S11 to S17 of FIG. 12 are similar to steps S1 to S7 of FIG. 11, detailed description thereof is abbreviated for the sake of brevity. In the same manner as in FIG. 11, variables A$_X$ and B$_X$ are obtained from R$_X$=Q$_X$.

Thus, relation between the distance DIST$_X$ and the X-axis component R$_X$ is given by the following equation.

$$DIST_X = A_X \cdot R_X + B_X$$

By the above described procedures of FIGS. 11 and 12, a Z-axis coordinate of the workpiece in the travelling direction of the lateral and vertical slit beams in the visual coordinate system can be obtained from the Y-axis coordinate P$_Y$ of the endpoint of the lateral slit image and the X-axis coordinate Q$_X$ of the endpoint of the vertical slit image.

Consequently, in the method of measuring the three-dimensional position of the workpiece, according to the present invention, the lateral slit beam and the vertical slit beam are irradiated at the vertical edge and the lateral edge of the workpiece, respectively and the image recognition camera receives the lateral and vertical slit images so as to recognize positions of the endpoints of the lateral and vertical slit beams, whereby the three-dimensional position of the workpiece can be measured from amounts of deviation of the positions of the endpoints of the lateral and vertical slit beams from the preset reference points through noncontact with the workpiece.

Meanwhile, when measurement is repeated by displacing the laser measuring unit in the optical axis of the camera, three-dimensional positions of not less than 3 points of the workpiece can be measured, so that the three-dimensional position of the workpiece as a whole can be measured.

Furthermore, by comparing displacement of the slit beams with displacement of the laser measuring unit at the time when the laser measuring unit is displaced in the optical direction of the camera, not only determination of the reference points but measurement of the three-dimensional position of the workpiece can be performed automatically. As a result, in accordance with the present invention, adjusting operation of the printed circuit board of the display unit, which has been so far performed mainly manually, can be performed automatically.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A method of measuring a three-dimensional position of a workpiece by using a laser measuring unit provided at a hand portion of an industrial robot, the laser measuring unit including an image recognition camera, a first laser beam source for emitting a lateral slit beam obliquely and forwardly from a vertical axis of a visual coordinate system of the image recognition camera and a second laser beam source for emitting a vertical slit beam obliquely and forwardly from a lateral axis of the visual coordinate system, the method comprising:

the first step of positioning the laser measuring unit such that the laser measuring unit confronts the workpiece;

the second step of emitting the lateral and vertical slit beams towards the workpiece from the first and second laser beam sources, respectively;

the third step of inputting the lateral and vertical slit beams on the workpiece, as first and second slit images, into the image recognition camera, respectively;

the fourth step of detecting a first point of a maximum output of the lateral slit beam at an edge of the workpiece in the first slit image and a second point of a maximum output of the vertical slit beam at another edge of the workpiece in the second slit image; and the fifth step of calculating the three-dimensional position of the workpiece based on a first amount of deviation of the first point from a first preset reference point and a second amount of deviation of the second point from a second preset reference point.

2. A method as claimed in claim 1, further comprising:

the sixth step of displacing the laser measuring unit relative to the workpiece;

the first to sixth steps being performed a plurality of times so as to calculate three-dimensional coordinates of the workpiece at not less than three positions of the workpiece such that the three-dimensional position of the workpiece is calculated.

3. A method as claimed in claim 1, wherein when the three-dimensional position of the workpiece is calculated on the basis of the first and second slit images, the laser measuring unit is displaced through a predetermined amount per each of a plurality of times relative to a reference workpiece fixed at a reference position so as to detect an amount of displacement of each of the first and second slit images such that a continuous functional relation between the predetermined amount of displacement of the laser measuring unit and the amount of displacement of each of the first and second slit images is established preliminarily.

4. A method as claimed in claim 2, wherein when the three-dimensional position of the workpiece is calculated on the basis of the first and second slit images, the laser measuring unit is displaced through a predetermined amount per each of a plurality of times relative to a reference workpiece fixed at a reference position so as to detect an amount of displacement of each of the first and second slit images such that a continuous functional relation between the predetermined amount of displacement of the laser measuring unit and the amount of displacement of each of the first and second slit images is established preliminarily.

* * * * *